(No Model.)

E. S. STONE.
BARREL TRUCK.

No. 346,958.   Patented Aug. 10, 1886.

Witnesses
Edwin L. Yewell,
H. J. Barrett.

Elias S. Stone, Inventor

By his Attorney Jas. N. Tyner

N. PETERS. Photo-Lithographer, Washington, D. C.

UNITED STATES PATENT OFFICE.

ELIAS S. STONE, OF LA GRO, INDIANA.

BARREL-TRUCK.

SPECIFICATION forming part of Letters Patent No. 346,958, dated August 10, 1886.

Application filed May 13, 1886. Serial No. 202,064. (No model.)

*To all whom it may concern:*

Be it known that I, ELIAS S. STONE, a citizen of the United States of America, residing at La Gro, in the county of Wabash and State of Indiana, have invented certain new and useful Improvements in Barrel-Trucks and Platforms, of which the following is a specification, reference being had therein to the accompanying drawings.

My invention relates to an improvement in barrel-trucks to be used in moving barrels and other similar vessels, and also to means whereby the truck may be swiveled to the floor in any desired locality, as under a counter, so that the truck, while serving as a platform or support for the barrel, may be easily swung around into a position which will admit of convenient access to the contents of the barrel.

The invention consists in the combination, with a triangular-shaped truck or platform provided at its corners on the under side with swiveled casters, of a socket secured to the floor of a room and adapted to receive one of the casters of the truck, in the manner and for the purpose hereinafter set forth.

Figure 1:
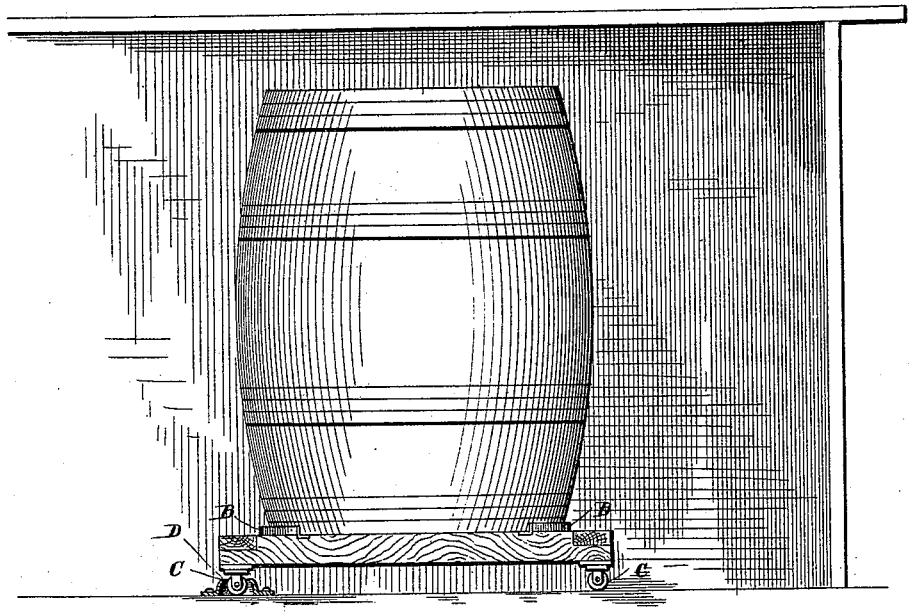
Figure 2:
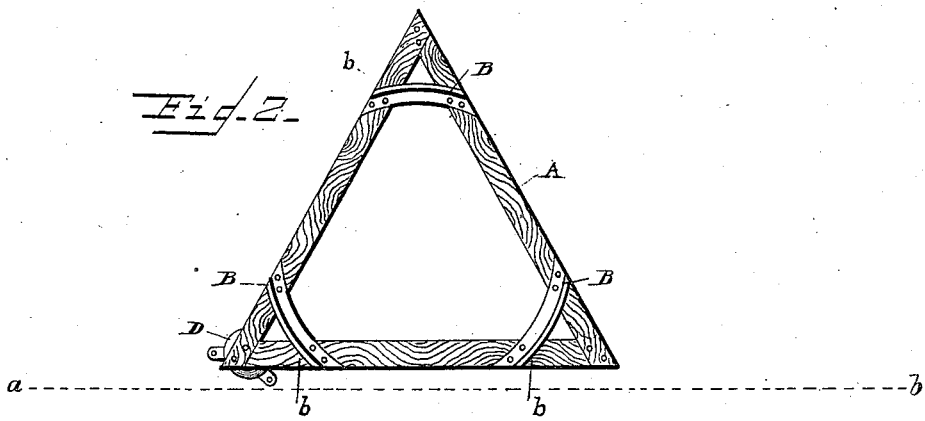
Figure 3:

In the accompanying drawings, Figure 1 is a side elevation of my improved truck or platform with a barrel thereon. Fig. 2 is a plan view of the truck or platform. Fig. 3 is a perspective view of a socket for the reception of one of the casters of the truck or platform.

Referring to the drawings, A represents a triangular frame-work, the pieces forming which being securely joined at the corners by screws, nails, bolts, or other suitable means. On top of the frame-work, near its corners, are secured arc-shaped bearers B, of iron or other suitable material, flanged along their outer edges, as at *b*. These bearers are for the purpose of supporting a barrel in proper position on the truck or platform, but, as will be observed, they incidentally act as braces to the frame-work. On the under side of the frame-work, at each corner, is swiveled a caster, C, permitting easy movement of the truck in any direction.

Secured to the floor of the room in any desired locality—as under a counter or table—is a socket, D, adapted to receive one of the casters of the truck, as shown in Fig. 1, the dotted line *a b* in Fig. 2 representing the rear line of the counter and the relative position thereto of the truck when the latter stands thereunder.

When it is desired to load the truck, the caster is disengaged from the socket and the truck moved over to the barrel or other vessel, which may be easily put upon the truck by lifting one corner of the latter and pushing the side resting upon the other two casters under the barrel, previously tilted for the purpose. Lowering the truck to the floor again, the barrel with a slight movement will be placed in proper position, when the loaded truck may be returned to its place and engaged with the socket, as above described.

By making the truck or platform of triangular shape and swiveling it to the floor in the manner above set forth, barrels and other light receptacles which it is sometimes desirable to store under the counter out of the way may be easily and conveniently swung out to the front, so that their contents may be reached, and as easily pushed back again to their proper position.

Having thus described my invention, what I claim as new, and desire to secure by Letters Patent, is—

1. The combination, with a truck or platform constructed as above described, of a socket secured to the floor of a building in any desired locality, one of the swiveled casters of the said truck or platform engaging with the socket, in the manner and for the purpose above set forth.

2. A triangular-shaped truck or platform provided on the under side at each corner with a swiveled caster, and on the upper side near each corner with a flanged arc-shaped bearer, substantially as described, and for the purpose set forth.

In testimony whereof I hereunto affix my signature in presence of two witnesses.

ELIAS S. STONE.

Witnesses:
MACY GOOD,
OLIVER H. BOGUE.